United States Patent
Kalscheur (10) Patent No.: US 11,092,689 B2
(45) Date of Patent: Aug. 17, 2021

(54) ENABLING LIDAR DETECTION

(71) Applicant: Apple Inc., Cupertino, CA (US)

(72) Inventor: Micah P. Kalscheur, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 393 days.

(21) Appl. No.: 15/709,405

(22) Filed: Sep. 19, 2017

(65) Prior Publication Data

US 2018/0081058 A1    Mar. 22, 2018

Related U.S. Application Data

(60) Provisional application No. 62/397,115, filed on Sep. 20, 2016.

(51) Int. Cl.

| | |
|---|---|
| *G01S 17/58* | (2006.01) |
| *G06F 16/248* | (2019.01) |
| *G01S 7/48* | (2006.01) |
| *G01S 7/51* | (2006.01) |
| *G01S 17/46* | (2006.01) |
| *G01S 17/931* | (2020.01) |
| *G01S 17/42* | (2006.01) |

(52) U.S. Cl.
CPC ............ *G01S 17/58* (2013.01); *G01S 7/4802* (2013.01); *G01S 7/4808* (2013.01); *G01S 7/51* (2013.01); *G01S 17/42* (2013.01); *G01S 17/46* (2013.01); *G01S 17/931* (2020.01); *G06F 16/248* (2019.01)

(58) Field of Classification Search
None
See application file for complete search history.

(56) References Cited

U.S. PATENT DOCUMENTS 3,739,385 A * 6/1973 Bechtel ............... G01S 1/02
                                                343/705
5,353,109 A * 10/1994 Langdon ............ G01S 7/4802
                                                356/28.5

(Continued)

FOREIGN PATENT DOCUMENTS

| | | |
|---|---|---|
| DE | 3930109 | 11/1990 |
| FR | 2576126 | 7/1986 |

(Continued)

OTHER PUBLICATIONS

Invitation to Pay Additional Fees from PCT/US2017/052568, dated Dec. 15, 2017, Apple Inc., pp. 1-15.

(Continued)

*Primary Examiner* — Yuqing Xiao
*Assistant Examiner* — Amir J Askarian
(74) *Attorney, Agent, or Firm* — Robert C. Kowert; Kowert, Hood, Munyon, Rankin & Goetzel, P.C.

(57) ABSTRACT

A system for detecting a vehicle includes a light source configured to emit a light signal. The system also includes a receiver sensor configured to receive a reflected light signal based at least in part on the light signal reflected from a plurality of reflectors. The system also includes a controller, the controller configured to identify an arrangement pattern of the plurality of reflectors based at least in part on the reflected light signal and determine that plurality of reflectors are coupled to another vehicle based at least in part on an identification of the arrangement pattern.

18 Claims, 6 Drawing Sheets

(56) References Cited

U.S. PATENT DOCUMENTS

| | | | | |
|---|---|---|---|---|
| 5,760,708 | A * | 6/1998 | Seith | G01S 13/931 340/903 |
| 5,784,023 | A * | 7/1998 | Bluege | G01S 7/4815 342/104 |
| 5,809,161 | A * | 9/1998 | Auty | G01P 3/38 340/937 |
| 6,714,665 | B1 * | 3/2004 | Hanna | G06K 9/00 382/106 |
| 7,298,262 | B2 * | 11/2007 | Hofbeck | B60R 21/01534 280/735 |
| 10,176,722 | B1 * | 1/2019 | Boyd | G08B 25/10 |
| 2002/0089722 | A1 * | 7/2002 | Perkins | G01S 1/70 398/140 |
| 2003/0114964 | A1 * | 6/2003 | Strumolo | G08G 1/165 701/1 |
| 2005/0056467 | A1 * | 3/2005 | Hofbeck | B60R 21/01534 177/2 |
| 2006/0227317 | A1 * | 10/2006 | Henderson | G01B 11/026 356/28 |
| 2007/0058164 | A1 * | 3/2007 | Shibata | G01N 21/95607 356/237.2 |
| 2010/0097200 | A1 * | 4/2010 | Hilsebecher | G01S 7/412 340/436 |
| 2010/0219761 | A1 * | 9/2010 | Damink | H05B 37/0272 315/152 |
| 2010/0271617 | A1 * | 10/2010 | Damink | G01S 17/36 356/5.09 |
| 2010/0295705 | A1 * | 11/2010 | Walter | B60Q 1/143 340/937 |
| 2012/0154785 | A1 * | 6/2012 | Gilliland | G01S 7/4813 356/5.01 |
| 2012/0195459 | A1 * | 8/2012 | Schmidt | G06K 9/00335 382/103 |
| 2013/0148846 | A1 * | 6/2013 | Maeda | G06K 9/209 382/103 |
| 2014/0012434 | A1 * | 1/2014 | Spence | G01S 15/93 701/2 |
| 2014/0028011 | A1 * | 1/2014 | Yamauchi | G03G 9/08 283/74 |
| 2014/0195138 | A1 * | 7/2014 | Stelzig | G08G 1/0116 701/119 |
| 2014/0226146 | A1 * | 8/2014 | Loschmidt | G08G 1/017 356/5.01 |
| 2014/0229034 | A2 * | 8/2014 | Spence | G01S 15/42 701/2 |
| 2014/0232599 | A1 * | 8/2014 | Behrens | G01S 13/06 342/385 |
| 2015/0197246 | A1 * | 7/2015 | Nagasaka | B60W 30/10 701/1 |
| 2015/0278596 | A1 * | 10/2015 | Kilty | G06K 9/00476 382/113 |
| 2015/0293225 | A1 * | 10/2015 | Riley | G05D 1/0684 356/4.01 |
| 2015/0325127 | A1 * | 11/2015 | Pandita | G08G 1/16 701/431 |
| 2016/0139594 | A1 * | 5/2016 | Okumura | G05D 1/0022 701/2 |
| 2016/0146618 | A1 * | 5/2016 | Caveney | B60W 30/00 701/25 |
| 2016/0161602 | A1 * | 6/2016 | Prokhorov | G01S 7/4972 702/97 |
| 2016/0162747 | A1 * | 6/2016 | Singh | G06K 9/00362 348/148 |
| 2016/0357188 | A1 * | 12/2016 | Ansari | G05D 1/0212 |
| 2017/0106738 | A1 * | 4/2017 | Gillett | B60K 7/0007 |
| 2017/0234976 | A1 * | 8/2017 | Grauer | G01S 17/107 356/5.04 |
| 2017/0328992 | A1 * | 11/2017 | Baik | G01S 7/497 |
| 2018/0033145 | A1 * | 2/2018 | Schoenberg | G06T 7/80 |
| 2018/0067194 | A1 * | 3/2018 | Wodrich | G01S 13/58 |
| 2018/0104600 | A1 * | 4/2018 | Stenzler | G08B 21/22 |
| 2018/0259616 | A1 * | 9/2018 | Jo | G01S 17/36 |
| 2018/0284759 | A1 * | 10/2018 | Michalakis | B60W 50/082 |
| 2019/0056498 | A1 * | 2/2019 | Sonn | G01S 17/107 |
| 2019/0149742 | A1 * | 5/2019 | Inoue | G06K 9/325 348/353 |

FOREIGN PATENT DOCUMENTS

| | | |
|---|---|---|
| FR | 2576126 A1 | 7/1986 |
| JP | 2009292316 | 12/2009 |

OTHER PUBLICATIONS

International Search Report and Written Opinion from PCT/US2017/052568, dated Feb. 6, 2018, pp. 1-17.

* cited by examiner

ENABLING LIDAR DETECTION

This application claims benefit of priority to U.S. Provisional Application No. 62/397,115, filed Sep. 20, 2016, titled "Enabling Lidar Detection," which is hereby incorporated by reference in its entirety.

BACKGROUND

Roads or road signs include reflective materials, such as reflective paint or attachments, to improve their optical visibility by reflecting light. Lane markers generally include a reflective paint in addition to physical bumps to ensure that drivers can be made aware of the lane's outer bounds even in low-light situations. License plates on vehicles also include reflective materials to better illuminate the text on the license plate to be visible to other drivers, including police officers.

Autonomous vehicles include numerous sensors configured to detect obstacles that may appear while driving. These obstacles may include other vehicles driving along the same road. Vehicles on the road may be detected by the sensors, such as a light detection and ranging (lidar) sensor or a radar sensor. The sensors may generally be able to detect a vehicle by determining that a lidar signal or a radar signal has been reflected by the vehicle. The sensors may not necessarily be able to determine that the obstacle is a vehicle by simply having reflected signals. Detectability of other vehicles on the road can be improved by making the sensors more effective by improving usability of signals detectable by the sensors.

SUMMARY

Systems and methods for enabling lidar detection on a vehicle are described herein. In some embodiments, a vehicle may include a light source configured to emit a light signal, a receiver sensor configured to receive a reflected light signal based at least in part on the light signal reflected from a plurality of reflectors and a controller. The controller may be configured to identify an arrangement pattern of the plurality of reflectors based at least in part on the reflected light signal and determine that plurality of reflectors are coupled to another vehicle based at least in part on an identification of the arrangement pattern.

In some embodiments, a non-transitory computer-readable storage medium may store instructions that, when executed by one or more processors, cause the one or more processors to receive, from a receiver sensor, sensor data corresponding to a reflected light signal from a plurality of reflectors. The instructions may also cause the one or more processors to determine an arrangement pattern of the plurality of retroreflectors based at least in part on the sensor data. The instructions may further cause the one or more processors to identify a vehicle comprising the plurality of reflectors based at least in part on the arrangement pattern.

In other embodiments, a vehicle may include a plurality of retroreflectors configured to have a peak reflectivity at a wavelength for non-visible light. The plurality of retroreflectors are configured to reflect a signal comprising non-visible light. The vehicle may include a front panel including a front subset of the plurality of retroreflectors comprising a front arrangement pattern, a rear panel including a rear subset of the plurality of retroreflectors comprising a rear arrangement pattern and a side panel including a side subset of the plurality of retroreflectors comprising a side arrangement pattern.

DETAILED DESCRIPTION

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.).

For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

Figure 1:
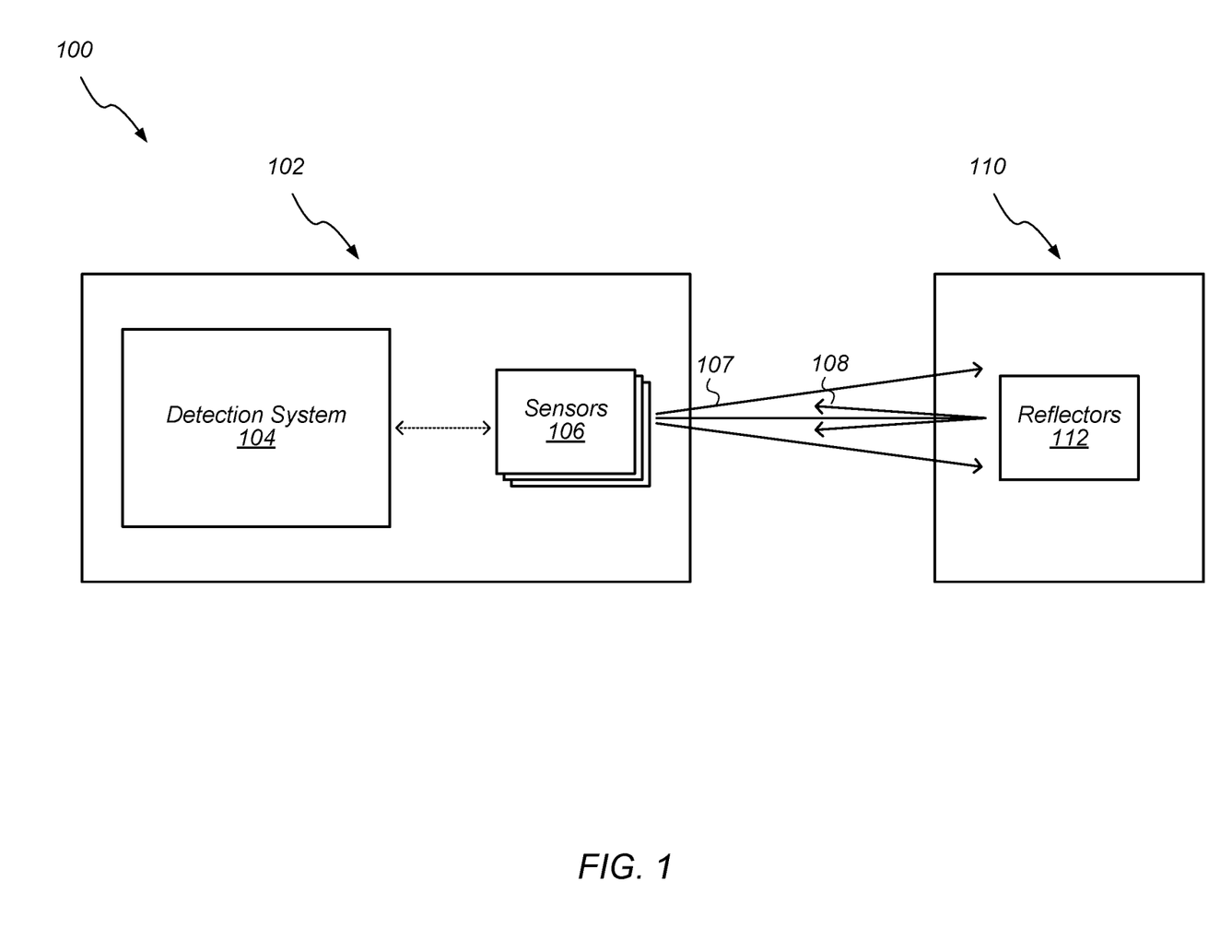
FIG. 1 illustrates a block diagram of a vehicle having one or more sensors configured to detect another vehicle, according to some embodiments.

FIG. 1 illustrates a block diagram of a lidar detection system 100 including a vehicle 102 and a vehicle 110. The vehicle 102 may include a detection system 104 and one or more sensors 106. The vehicle 110 may include a plurality of reflectors 112.

The one or more sensors 106 may be configured to send a light signal 107 in an outward direction from the vehicle 102 to an obstacle during travel on a road. The detection system 102 may determine that the obstacle is present in response to the one or more sensors 106 receiving a reflected light signal 108 that is based on the light signal 107 being reflected from the obstacle. In other words, the light signal 107 may reach an obstacle and be reflected by the obstacle as a reflected light signal 108. In some situations, the obstacle may have poor reflectivity and cause the light signal 107 to be absorbed by the obstacle or be deflected away from the one or more sensors 106 in an undesirable direction. Reflectivity can be improved by retroreflectors configured to reflect the signal 107 back to a corresponding signal source, e.g., the one or more sensors 106.

The detection system 104 may determine that the one or more sensors 106 based on signals 107 sent from the one or more sensors 106 being reflected by the plurality of reflectors 112 of the vehicle 110. Visibility of the vehicle 110 by the vehicle 102 may be improved when signals 107 sent from the vehicle 102 are reflected by the vehicle 110. The detection system 102 may be configured to determine whether the one or more sensors 106 have detected the vehicle 110. For example, the one or more sensors 106 may include a light detection and ranging (lidar) sensor configured to output a light signal 107. The light signal 107 may be sent from the one or more sensors 106 in an outward direction from the vehicle 102. The light signal 107 may include one or more pixels that configured to be dense. For example, the one or more pixels may be volume pixels (e.g., voxels) that are configured to convey information to and from the vehicle 102. In some embodiments, the light signal 107 may include a code that identifies the vehicle 102. For example, the detection system 104 may be configured to determine whether a reflected light signal 107 originated from the vehicle 102 based on the code.

The one or more sensors 106 may be configured to modify a waveform of the light signal 107 to have a first waveform shape. When the light signal 107 is reflected by the plurality of reflectors 112, the reflected light signal 108 may have a waveform with a second waveform shape that is at least partially different from the first waveform shape. The waveform shapes may indicate distinguishing features between materials of the plurality of reflectors 112. Other surfaces, such as roads, walls, trees, etc. may cause different waveform shapes in the reflected light signal 108. The vehicle 102 may include additional machine learning components configured to analyze the waveform shapes to classify the material types of the other surfaces. In some embodiments, the detection system 104 may be configured to determine the material type based on the waveform shapes.

The plurality of reflectors 112 may be configured to reflect the light signal 107 as a reflected light signal 108. The plurality of reflectors 112 may be discreetly embedded in the vehicle 110. For example, the plurality of reflectors 112 may be positioned behind an outer body panel of the vehicle 110. The outer body panel may be formed from a non-conductive material that allows the signal 107 from the one or more sensors 106 of the vehicle 102 to pass through to the plurality of reflectors 112 without signal degradation or distortion. For example, the outer body panel may allow the signal 107 to pass through to the plurality of reflectors 112, but the outer body panel may prevent visible light from passing through. The non-conductive material may be acrylonitrile butadiene styrene (ABS) plastic, polythene plastic, polyethylene plastic, polystyrene plastic, polyvinyl chloride plastic, a thermoplastic polymer, acrylic plastic, glass, or any combination thereof.

The plurality of reflectors 112 may be arranged in a particular pattern, as described herein. The detection system 104 may be configured to determine information about the vehicle 110 based on the particular pattern reflecting the light signal 107. For example, the detection system 104 may determine that the plurality of reflectors 112 do in fact belong to the vehicle 110 rather than a road sign or a wall based on the particular pattern.

The detection system 104 may be further configured to determine information about the vehicle 110 based on the arrangement pattern of the plurality of reflectors 112. In some embodiments, the detection system 104 may determine vehicle information corresponding to the vehicle 110. For example, the detection system 104 may be configured to recognize that the arrangement pattern is indicative of vehicles made by Maker X. In some embodiments, the detection system 104 may search a database using the arrangement pattern. In other embodiments, the detection system 104 may use a lookup table to identify corresponding information of the vehicle 110 based on the arrangement pattern.

During the course of normal travel, obstructions between the vehicle 102 and the plurality of reflectors 112 may cause the one or more sensors 106 from properly detecting at least a portion of the plurality of reflectors 112. The one or more sensors 106 may be configured to aggregate multiple data points over a period of time to create an average view of the plurality of reflectors 112 to accommodate for potentially missed data.

The plurality of reflectors 112 may be configured to combine individual reflections of the light signal 107 at each of the plurality of reflectors 112 to increase luminosity of the reflected light signal 108 with respect to the light signal 107. For example, subsets of the plurality of reflectors 112 may combine light at a respective reflection point of a particular subset of reflectors to create a gain in the light signal 107. In some embodiments, the gain may be approximately 1000% the luminosity of the light signal. By increasing the luminosity of the light signal, the reflected light signal 108 can be more visible upon returning to the vehicle 102 allowing the vehicle 102 to have an effectively longer sensing distance.

The plurality of reflectors 112 may include retroreflectors configured to reflect the signal 107 as a reflected signal 108 directed back toward a corresponding signal source, e.g., the one or more sensors 106 of the vehicle 102. The one or more sensors 106 may receive or detect the reflected signal 108 after being reflected by the vehicle 110. In some embodiments, the plurality of retroreflectors 104 may be configured to append additional information to the signal 107 such that the reflected signal 108 includes the additional information.

In some embodiments, the vehicle 102 may include a plurality of reflectors to improve detectability by other vehicles, such as the vehicle 110. The vehicle 110 may include a detection system and one or more sensors. The detection system of the vehicle 110 may be configured to determine whether the one or more sensors of the vehicle 110 have detected obstacles, such as the vehicle 102. For example, the one or more sensors of the vehicle 110 may be configured to send a light signal 107 toward the vehicle 102 which may be configured to reflect the light signal 107 with the plurality of reflectors on the vehicle 102.

Figure 2A:
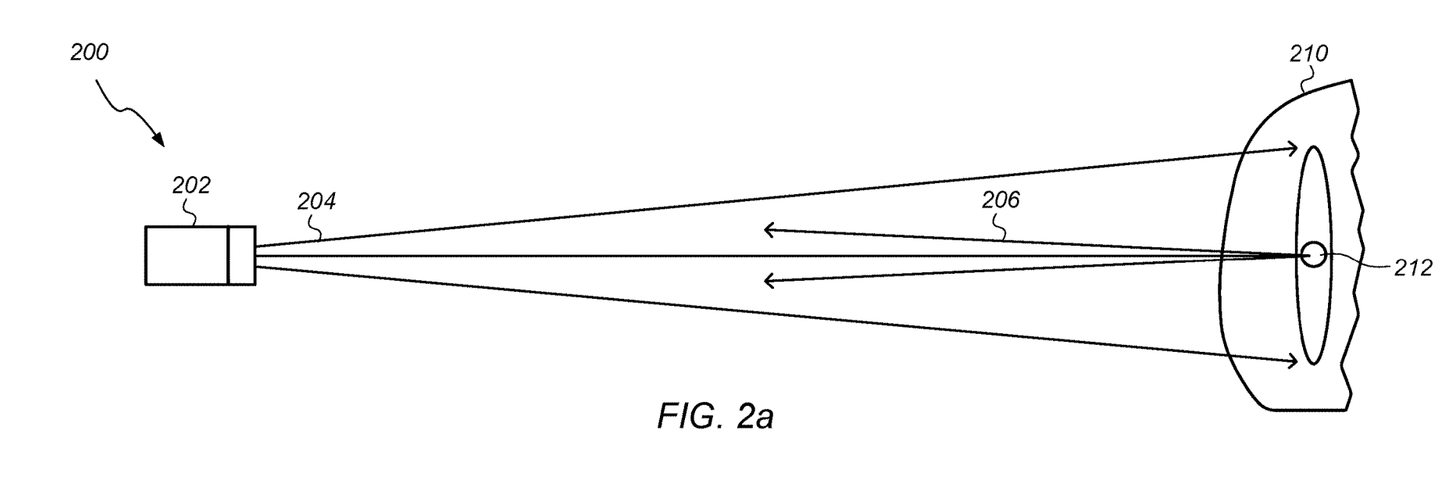
FIG. 2a illustrates a side view of a sensor configured to send a signal to a plurality of reflectors embedded in a vehicle.

FIG. 2a illustrates a vehicle detection system 200 having one or more sensors 202 configured to emit a signal 204 toward another vehicle 210. The vehicle 210 may include a plurality of reflectors 212 configured to reflect the signal 204 as a reflected signal 206. The plurality of reflectors 212 may include retroreflectors configured to reflect the signal as a reflected signal directed back toward a corresponding signal source, e.g., the one or more sensors 202. The one or more sensors 202 may receive or detect the reflected signal after being reflected.

The plurality of reflectors 212 may include one of many types of retroreflectors configured to reflect the signal 204 at inward angle as a reflected signal 206 with an outward angle that is equal in magnitude but opposite in direction relative to the inward angle.

Visibility of the vehicle 210 by the one or more sensors 202 is improved when signals, such as the signal 204, sent from the one or more sensors 102 are reflected by the vehicle 210 as the reflected signal 206. The one or more sensors 202 may receive or detect the reflected signal after being reflected by the vehicle 210.

Figures 2B, 2C:
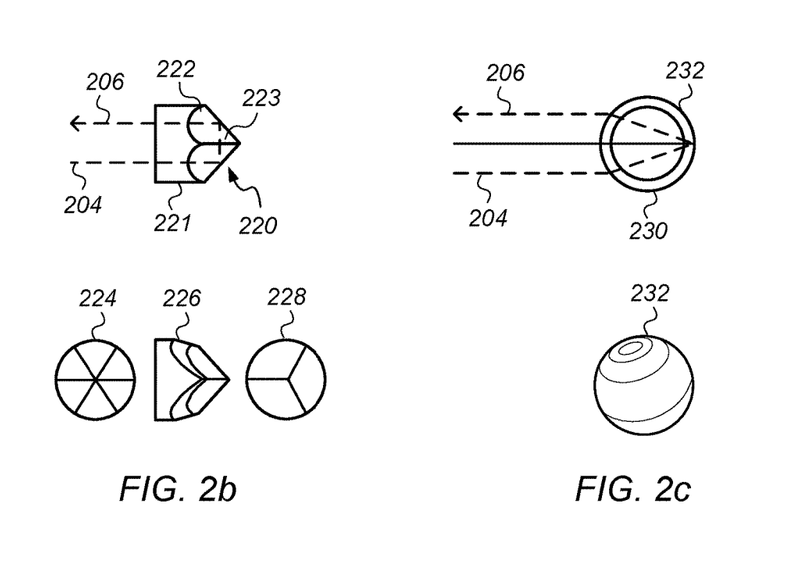
FIGS. 2b-d illustrate various types of reflectors configured to reflect signals according to some embodiments.

FIG. 2b illustrates a refractive retroreflector 220, according to some embodiments. The refractive retroreflector 220 may include a non-conductive material 221, a plurality of lenses 222 and a focal point 223. FIG. 2b further illustrates a front view 224 of the refractive retroreflector, a side view 226 and a rear view 228. The refractive retroreflector 220 may also be referred to as a cats-eye retroreflector. In some embodiments, the plurality of reflectors 212 may include one or more refractive retroreflectors 220.

The non-conductive material 221 (e.g., a dielectric material) may be configured to minimize radio frequency or radar signal absorption for improved signal pass-through for the signal 204. The non-conductive material 221 may be acrylonitrile butadiene styrene (ABS) plastic, polythene plastic, polyethylene plastic, polystyrene plastic, polyvinyl chloride plastic, a thermoplastic polymer, acrylic plastic, glass, or any combination thereof.

The plurality of lenses 222 may be molded to be convex lenses such that a convex lens of the plurality of lenses 222 may have a focal point 223. For example, the signal 204 may approach the plurality of lenses 222 at a first inward angle. The plurality of lenses 222 may cause the signal 204 to be directed to the focal point 223 at a first outward angle. In some embodiments, the plurality of lenses 222 may cause all incoming signals to be directed to the focal point 223 regardless of corresponding inward angles. After directed by the plurality of lenses 222, the signal 204 may approach the inner body panel at a second inward angle. The focal point 223 may be configured to create a reflected signal 206 by reflecting the signal 204 at a first outward angle such that the first outward angle and the second inward angle add up to 180° (e.g., a supplementary angle with respect to the second inward angle). The plurality of lenses 202 may refract the reflected signal 206 at a second outward angle that is substantially similar to the first inward angle. In other words, the signal 204 is substantially parallel to the reflected signal 206 traveling toward the one or more sensors 202.

The focal point 223 may be a reflective surface. In some embodiments, the focal point 223 may be formed from a metallic alloy. In other embodiments, the focal point 223 may be a rigid material covered by a conductive coating. For example, the focal point 223 may be formed from a plastic material that is covered by a metallic, conductive surface.

FIG. 2c illustrates a spherical retroreflector 230, according to some embodiments. In some embodiments, the plurality of reflectors 212 may include one or more spherical retroreflectors 230 configured to direct the reflected signal 206 in a direction that the signal 204 originated (e.g., toward the one or more sensors 202).

The spherical retroreflector 230 may be formed from a glass material or an optical grade polymer. The spherical retroreflector 230 may include a reflective layer 232 configured to reflect the signal 204 to the one or more sensors 202 as the reflected signal 206. In some embodiments, the reflective layer 232 may be formed from a metallic alloy. In other embodiments, the reflective layer 232 may be a rigid material covered by a conductive coating. For example, the reflective layer 232 may be formed from a plastic material that is covered by a metallic, conductive surface. The reflective layer 232 may be coupled to the refractive sphere in situ (e.g., after setting the refractive sphere in an extrusion). Alternatively, the reflective layer 232 may be coupled to the refractive sphere prior to setting the refractive sphere in the extrusion.

Figure 2D:
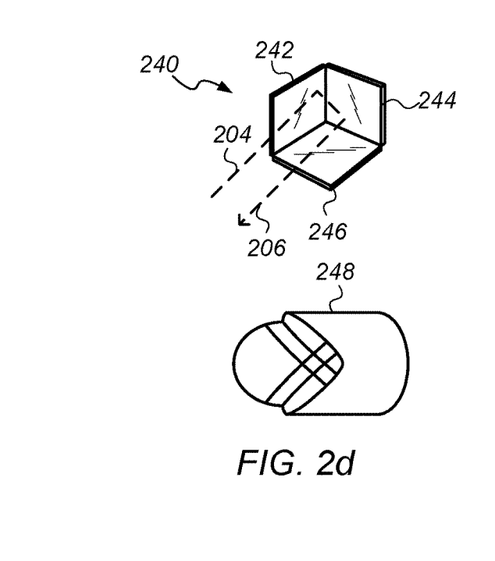

FIG. 2d illustrates a corner-cube retroreflector 240, according to some embodiments. In some embodiments, the plurality of reflectors 212 may include a plurality of corner-cube reflectors configured to direct the reflected signal 206 in a direction that the signal 204 originated (e.g., toward the one or more sensors 202). FIG. 2d further illustrates an outer view 248 of the corner-cube retroreflector 240. In some embodiments, the plurality of reflectors 212 may include one or more corner-cube reflectors 240.

A corner-cube reflector 240 may be formed by arranging a set of surfaces to form a corner of a cube. The set of surfaces may be perpendicular with respect to each of the surfaces. In some embodiments, three surfaces are used to form each corner-cube retroreflector 240. In other embodiments, the corner of the cube may be molded or shaped from a reflective material. The signal may hit a first surface 242 of the corner-cube reflector such that the signal is reflected toward a second surface 244 of the corner-cube reflector at a supplementary angle (i.e., an angle that would add up to 180° with another angle). For example, the signal may hit the first surface at a first inward angle of 30° and be reflected toward the second surface at a first outward angle of 150° relative to the first surface. The signal 204 may be reflected to the second surface 244 at a second inward angle based on the first outward angle. The signal 204 may be reflected from the second surface 244 toward a third surface 246 of the corner-cube reflector 240 at a second outward angle that corresponds to another supplementary angle based on the second inward angle, which may be based on the first outward angle. The signal 204 may then be reflected from the third surface 246 as the reflected signal toward the signal source (e.g., the one or more sensors 202 at a third outward angle that is substantially similar to the first inward angle. In other words, the signal 204 sent from the one or more sensors 202 is substantially parallel to the reflected signal 206.

Figure 3A:
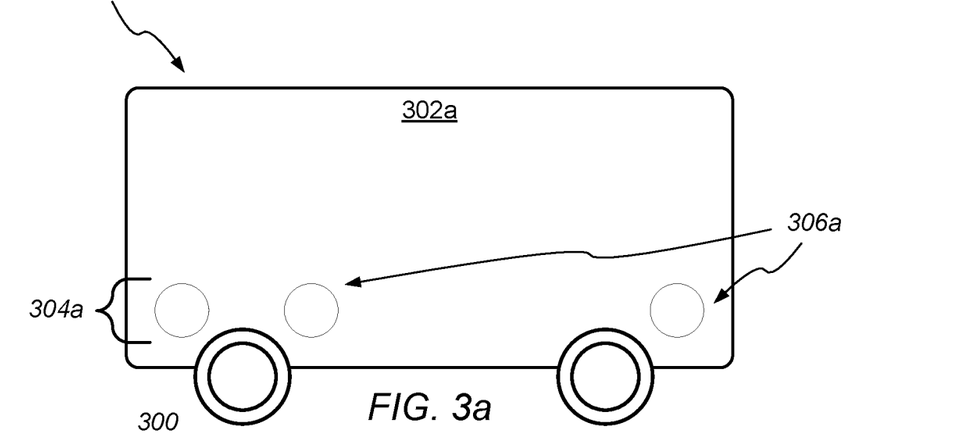
FIGS. 3a-c illustrate block diagrams of a vehicle having multiple patterns of pluralities of reflectors identifying multiple orientations of the vehicle, according to some embodiments.
Figure 3B:
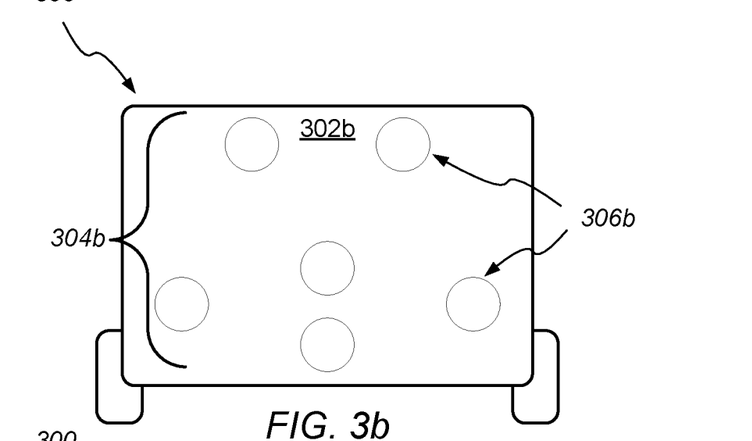
Figure 3C:
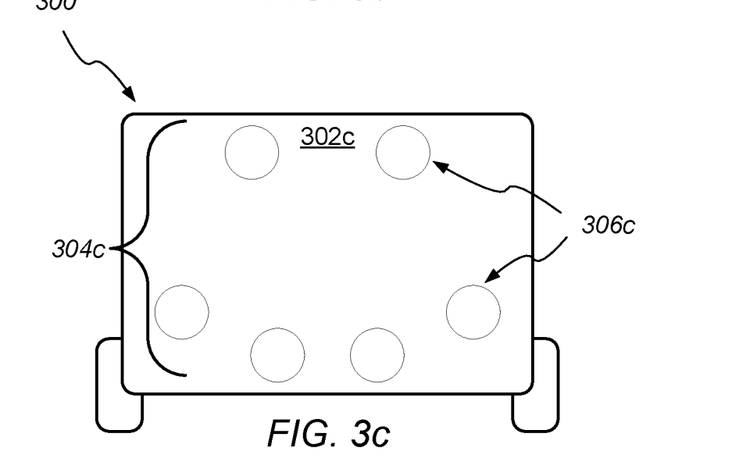

FIGS. 3a-c illustrate a vehicle 300 having multiple patterns of pluralities of reflectors. Each pattern may be arranged and configured to identify a particular side of the vehicle 300. Each pattern may be unique with respect to another pattern of the multiple patterns. FIG. 3a illustrates a side portion 302a of the vehicle 300. The side portion 302a may include a pattern 304a of a plurality of reflectors 306a. In some embodiments, the side portion 302a (e.g., a driver side) may have a corresponding opposite side portion (e.g., a passenger side) that includes another plurality of reflectors. For example, the other plurality of reflectors on the opposite side portion may have a different pattern than the pattern 304a. In another example, the other plurality of reflectors may have a pattern that is a mirrored version of the pattern 304a. FIG. 3b illustrates a front portion 302b of the vehicle 300. The front portion 302b may include a pattern 304b of a plurality of reflectors 306b. FIG. 3c illustrates a rear portion 302c of the vehicle 300. The rear portion 302c may include a pattern 304c of a plurality of reflectors 306b.

Other vehicles may be configured to detect presence of the vehicle 300 based on detection of at least one of the pluralities of reflectors 306a-c. In some embodiments, the other vehicle may correspond to the vehicle 102 of FIG. 1. For example, the other vehicle may be configured to emit a light signal that is reflected by at least one reflector of the pluralities of reflectors 306a-c. The other vehicle may be further configured to determine whether the side portion 302a, the front portion 302b or rear portion 302c of the vehicle 300 reflected the light signal based on which of the patterns 304a-c are detected. For example, the other vehicle may determine a relative orientation of the vehicle 300, such as whether the side portion 302a, the front portion 302b or rear portion 302c of the vehicle 300 is visible to the other vehicle based on determining whether the pattern 304a, the pattern 304b or the pattern 304c, respectively, were detected by one or more sensors of the other vehicle.

In some embodiments, each of the patterns 304a-c may be unique to a particular make and model of the vehicle 300. For example, each vehicle that is the same type of make and model as the vehicle 300 may have a side portion and a pattern corresponding to the pattern 304a. In other embodiments, each of the patterns 304a-c may be decipherable by a particular manufacturer. For example, the patterns 304a-c may include a proprietary layout such that only vehicles made by Maker X can specifically identify the vehicle 300 as also being made by Maker X, whereas vehicles made by Maker Y may recognize that the patterns 304a-c are present but not be able to decipher any information intended only for Maker X vehicles. In some embodiments, the Maker X vehicles may be configured to behave differently with other Maker X vehicles. For example, the Maker X vehicles may be configured to transmit data to other Maker X vehicles, such as information about road conditions or active suspension adjustments. The patterns 304a-c illustrated in FIGS. 3a-c are examples of a possible arrangements of the plurality of reflectors 306a-c and are not intended to be limiting the patterns 304a-c to any particular arrangements.

In some embodiments, each reflector of the pluralities of reflectors 306a-c may be a cluster of reflectors. The pluralities of reflectors 306a-c may include retroreflectors configured to reflect a signal from a signal source. For example, the signal may approach the side portion 302a at an inward angle. The plurality of reflectors 306a may be configured to reflect the signal at an outward angle substantially similar in magnitude and opposite in direction of the inward angle. In other words, the pluralities of reflectors 306a-c may be configured to reflect the light signal back in the direction of the signal source.

Each reflector or cluster of reflectors of the pluralities of reflectors 306a-c may be positioned with space between each other reflector or cluster to improve visibility at long distances. For example, another vehicle may include one or more sensors configured to emit a signal to detect nearby obstacles, including the vehicle 300. The space between each cluster of reflectors may allow the one or more sensors of the other vehicle to distinguish between individual clusters. At longer distances, the relative space between each cluster is smaller from a perspective of the other vehicle. The one or more sensors may have a density of lidar signals that is greater than a density of the patterns 304a-c. In some embodiments, the pluralities of reflectors 306a-c may include extents to contain the reflectors 306a-c at outside corners of the vehicle 300 in order to provide object size sensing.

The patterns 304a-c may be configured to dynamically change. In some embodiments, the pluralities of reflectors 306a-c may be configured to disable and enable different subsets of the pluralities of reflectors 306a-c. For example, the pluralities of reflectors 306a-c modulators configured to modulate the signal received by at least one reflector of the pluralities of reflectors 306a-c. Modulation may include adding a new signal (e.g., a digital bit stream or an analog signal) into an existing signal. In some embodiments, the one or more modulators may include one or more microelectromechanical systems (MEMS) configured to actively modulate the pluralities of reflectors 306a-c. In other embodiments, the one or more modulators may include active electrically controllable absorbers. For example, the active electrically controllable absorbers may be configured to absorb at least a portion of the signal 124 to affect the reflected signal 126. In some embodiments, the active electrically controllable absorbers may be controlled by one or more control elements to absorb or reduce reflectivity of the signal.

Figure 4:
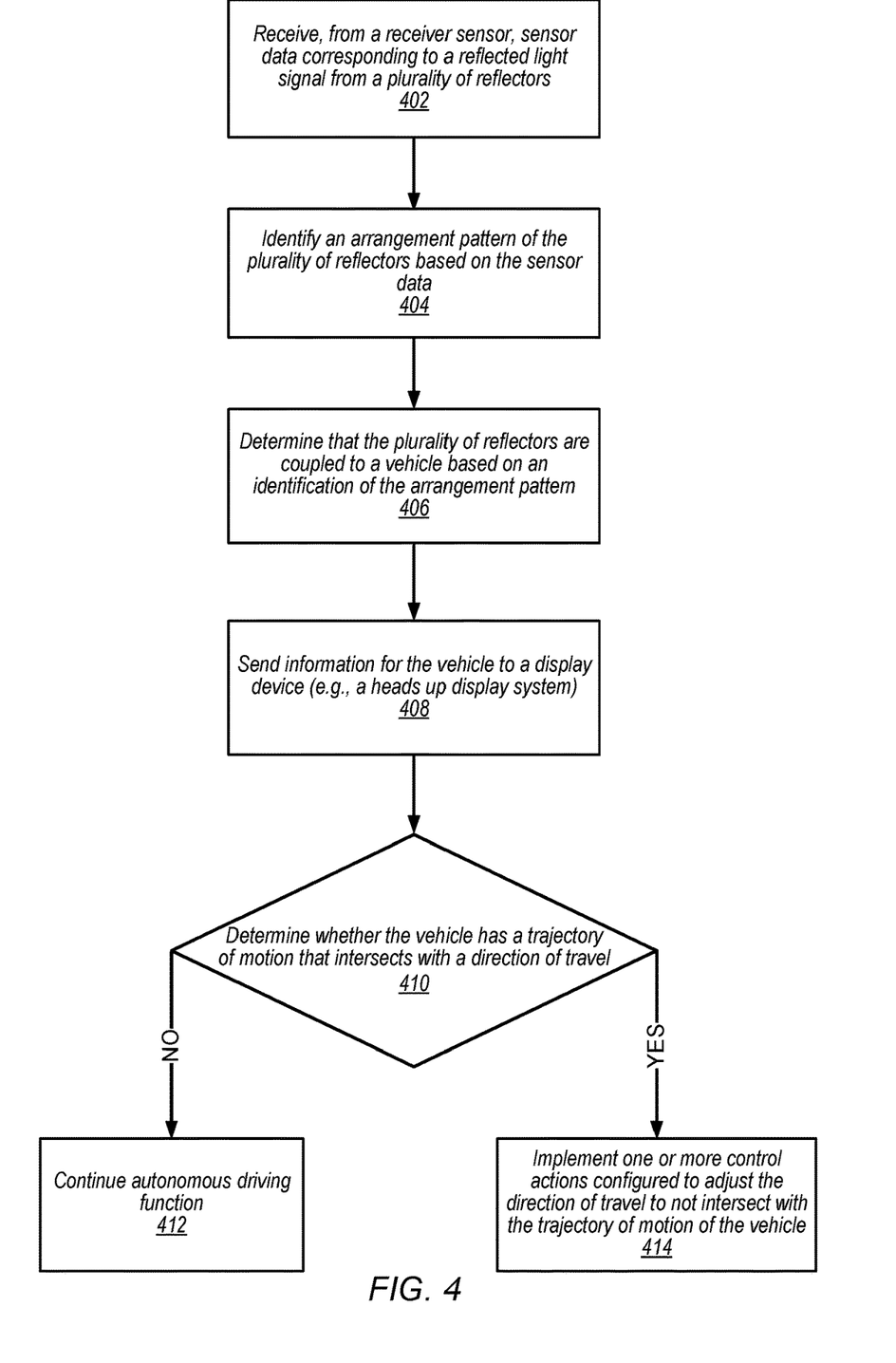
FIG. 4 illustrates a flowchart diagram of a method for determining whether a vehicle is detected by one or more sensors based at least in part on an arrangement pattern of a plurality of reflectors.

FIG. 4 illustrates a flowchart diagram of a method for a vehicle detecting another vehicle. The vehicle may correspond to the vehicle 102 of FIG. 1. The other vehicle may correspond to the vehicle 110 of FIG. 1, the vehicle 210 of FIG. 2 or the vehicle 300 of FIG. 3.

At 402, the vehicle may receive, from a receiver sensor, sensor data corresponding to a reflected light signal from a plurality of reflectors of another vehicle. For example, the receiver sensor may correspond to the one or more sensors 106 of FIG. 1 or the one or more sensors 202 of FIG. 2. The receiver sensor may include a lidar sensor configured to output a light signal and receive the reflected light signal. The light signal may be directed toward the other vehicle and be reflected by the plurality of reflectors as the reflected light signal.

At 404, the vehicle may identify an arrangement pattern of the plurality of reflectors based on the sensor data. For example, the sensor data may indicate that the plurality of reflectors has a particular arrangement based on particular pixels of the light signal being reflected as part of the reflected light signal. The arrangement pattern and examples thereof are described with reference to FIGS. 3a-c, as described herein.

At 406, the vehicle may determine that the plurality of reflectors are coupled to a vehicle based on an identification of the arrangement pattern. For example, the vehicle may have a detection system configured to analyze the arrangement pattern to determine whether the arrangement pattern matches known patterns that indicate that the arrangement pattern corresponds to a vehicle. In some embodiments, the known patterns may also indicate that the arrangement pattern corresponds to a fixed structure, such as a building or road signs.

At 408, the vehicle may send information corresponding to or associated with the other vehicle to a display device. For example, the display device may be configured to generate a heads-up display to convey information to a passenger of the vehicle. In some embodiments, the display device may be configured to display textual information corresponding to the other vehicle, such as make, model or other specifications of the other vehicle.

At 410, the vehicle may assess a current situation to determine whether the other vehicle has a trajectory of motion that potentially intersects with a direction of travel of the vehicle. For example, the vehicle may utilize one or more sensors to determine a current velocity to indicate that the vehicle is moving substantially faster than the other vehicle in a perpendicular direction. In another example, the vehicle may determine that the other vehicle is stationary based on the relative distance becoming shorter over a period of time potentially indicating that the other vehicle has stopped.

At 412, the vehicle may determine that the other vehicle does not have a trajectory of motion that intersects with the direction of travel of the vehicle. In some embodiments, the vehicle may be autonomous (e.g., configured to automatically drive and navigate without operation by a driver). In response to a determination that the other vehicle does not have an intersecting trajectory of motion, the vehicle may maintain current autonomous driving functions.

At 414, the vehicle may determine that the other vehicle has an intersecting trajectory of motion with the direction of travel of the vehicle. In some embodiments, the vehicle may implement one or more control actions configured to adjust the direction of travel to not intersect with the trajectory of motion of the other vehicle. For example, the vehicle may change the direction of travel by braking to a stop or turning to another direction to cause the direction of travel to no longer intersect with the trajectory of motion.

Figure 5:
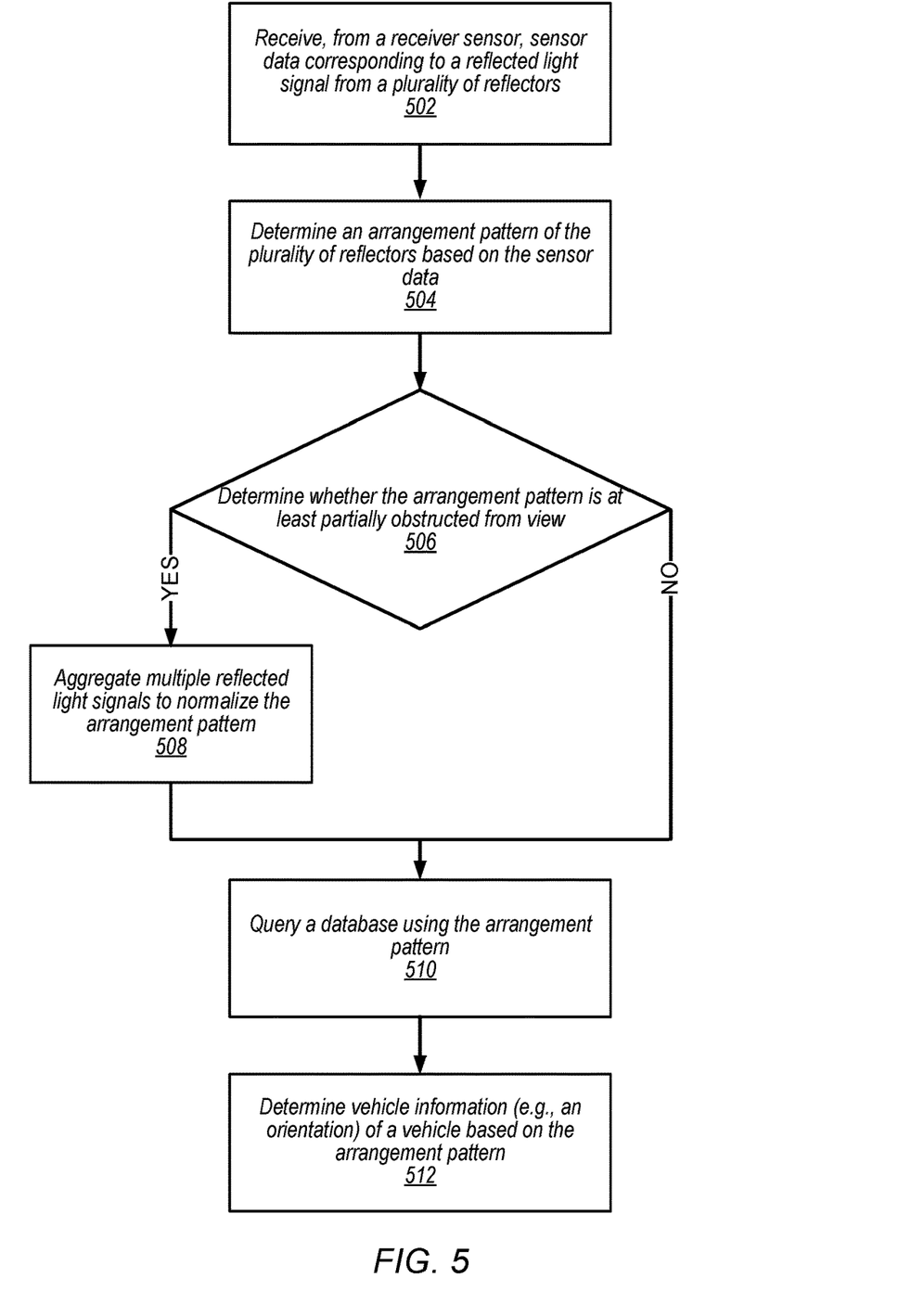
FIG. 5 illustrates a flowchart diagram of a method for determining an orientation of a vehicle based at least in part on an arrangement pattern of a plurality of reflectors.

FIG. 5 illustrates a flowchart diagram of a method for a vehicle detecting another vehicle. The vehicle may correspond to the vehicle 102 of FIG. 1. The other vehicle may correspond to the vehicle 110 of FIG. 1, the vehicle 210 of FIG. 2 or the vehicle 300 of FIG. 3.

At 502, the vehicle may receive, from a receiver sensor, sensor data corresponding to a reflected light signal from a plurality of reflectors of another vehicle. For example, the receiver sensor may correspond to the one or more sensors 106 of FIG. 1. The receiver sensor may include a lidar sensor configured to output a light signal and receive the reflected light signal. The light signal may be directed toward the other vehicle and be reflected by the plurality of reflectors as the reflected light signal.

At 504, the vehicle may determine an arrangement pattern of the plurality of reflectors based on the sensor data. For example, the sensor data may indicate that the plurality of reflectors has a particular arrangement based on particular pixels of the light signal being reflected as part of the reflected light signal. The arrangement pattern and examples thereof are described with reference to FIGS. 3*a-c*, as described herein.

At 506, the vehicle may determine whether the arrangement pattern is at least partially obstructed from view. For example, the arrangement pattern may have a portion covered by an obstruction, such as animals, road signs, rocks, speed bumps or any other type of physically obstructive object. The vehicle may detect that a portion where the arrangement pattern is expected may be non-reflective to the light signal.

At 508, in response to a determination that the arrangement pattern is at least partially obstructed from view, the vehicle may aggregate multiple reflected light signals over a period of time. For example, in response to a determination that the arrangement pattern is at least partially obstructed from view, the vehicle may receive more sensor data to attempt to capture the obstructed portions of the arrangement pattern. In some embodiments, the aggregated reflected light signals may be used to generate aggregated sensor data. The aggregated sensor data may be analyzed to determine an averaged or normalized version of the arrangement pattern.

At 510, the vehicle may query a database using the arrangement pattern to determine information about the other vehicle. For example, the database may include information that identifies multiple orientations of the other vehicle based on a particular arrangement pattern of the plurality of reflectors. The database may also include information about the make, model, year, specifications, or any other information about the vehicle. In some embodiments, the database may be configured to use the arrangement pattern as a basis of the search, similar to a search term is used on a web search form.

At 512, the vehicle may determine vehicle information corresponding to or associated with the other vehicle based on the arrangement pattern. In some embodiments, the vehicle information may include an orientation of the other vehicle. The orientation of the other vehicle may be relative to the vehicle such that the orientation may be what the vehicle is capable of detecting within its line of sight. For example, the other vehicle may be in front of the vehicle such that the vehicle is only able to detect a rear portion of the other vehicle. Thus, the relative orientation of the other vehicle would have the rear portion facing the vehicle.

Figure 6:
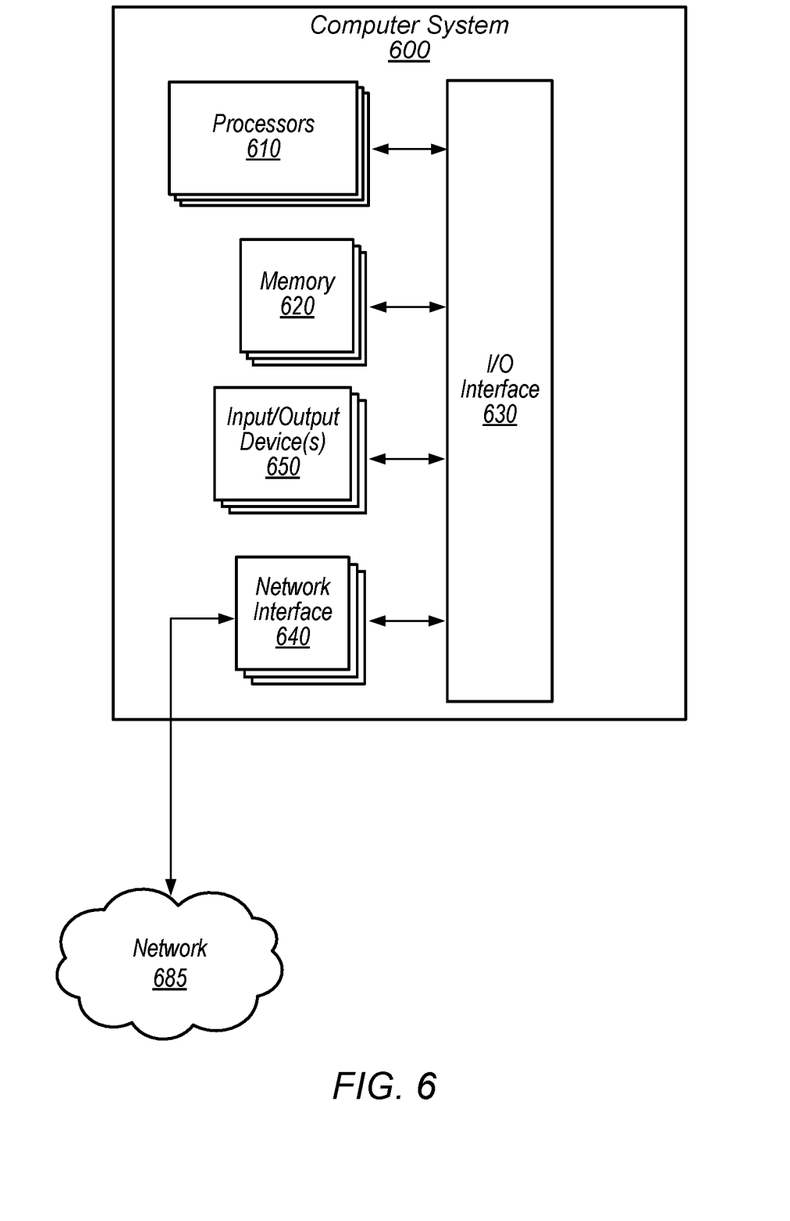
FIG. 6 illustrates an example computer system configured to implement one or more portions of a motion minimization system, according to some embodiments.

FIG. 6 illustrates an example computer system 600 that may be configured to include or execute any or all of the embodiments described above. In different embodiments, computer system 600 may be any of various types of devices, including, but not limited to, a personal computer system, desktop computer, laptop, notebook, tablet, slate, pad, or netbook computer, cell phone, smartphone, PDA, portable media device, mainframe computer system, handheld computer, workstation, network computer, a camera or video camera, a set top box, a mobile device, a consumer device, video game console, handheld video game device, application server, storage device, a television, a video recording device, a peripheral device such as a switch, modem, router, or in general any type of computing or electronic device.

Various embodiments of an audio communication system, talker feedback system, some combination thereof, etc., as described herein, may be executed in one or more computer systems 600, which may interact with various other devices. Note that any component, action, or functionality described above with respect to FIGS. 1 through 5 may be implemented on one or more computers configured as computer system 600 of FIG. 6, according to various embodiments. In the illustrated embodiment, computer system 600 includes one or more processors 610 coupled to a system memory 620 via an input/output (I/O) interface 630. Computer system 600 further includes a network interface 640 coupled to I/O interface 630, and one or more input/output devices, which can include one or more user interface (also referred to as "input interface") devices. In some cases, it is contemplated that embodiments may be implemented using a single instance of computer system 600, while in other embodiments multiple such systems, or multiple nodes making up computer system 600, may be configured to host different portions or instances of embodiments. For example, in one embodiment some elements may be implemented via one or more nodes of computer system 600 that are distinct from those nodes implementing other elements.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

System memory 620 may be configured to store program instructions, data, etc. accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions included in memory 620 may be configured to implement some or all of an ANS, incorporating any of the functionality described above. Additionally, existing control data of memory 620 may include any of the information or data structures described above. In some embodiments, program instructions and/or data may be received, sent or stored upon different types of computer-accessible media or on similar media separate from system memory 620 or computer system 600. While computer system 600 is described as implementing the functionality of functional blocks of previous FIGS., any of the functionality described herein may be implemented via such a computer system.

In one embodiment, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices attached to a network 685 (e.g., carrier or agent devices) or between nodes of computer system 600. Network 685 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices may, in some embodiments, include one or more display terminals, keyboards, keypads, touchpads, scanning devices, voice or optical recognition devices, or any other devices suitable for entering or accessing data by one or more computer systems 600. Multiple input/output devices may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

Memory 620 may include program instructions, which may be processor-executable to implement any element or action described above. In one embodiment, the program instructions may implement the methods described above. In other embodiments, different elements and data may be included. Note that data may include any data or information described above.

Those skilled in the art will appreciate that computer system 600 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A vehicle, comprising:
    a light source configured to emit light signals, wherein the light signals comprise a first light signal emitted at a first point in time and a second light signal emitted at a second point in time;
    a receiver sensor configured to receive a plurality of reflected light signals over a period of time based at least in part on the first light signal and the second light signal reflected from a plurality of reflectors; and
    a controller coupled to the receiver sensor and configured to:
        detect an arrangement pattern of the plurality of reflectors using the reflected light signals;
        determine that the plurality of reflectors is coupled to another vehicle based at least in part on the detected arrangement pattern corresponding to a known pattern for vehicles;
        determine a first relative distance to the other vehicle based at least in part on the first reflected light signal;
        determine a second relative distance to the other vehicle based at least in part on the second reflected light signal; and
        determine whether the other vehicle is stationary based at least in part on the first relative distance, the second relative distance and a velocity of the receiver sensor.

2. The vehicle of claim 1, wherein the controller is further configured to determine a distance to the other vehicle based at least in part on relative spacing of the plurality of reflectors in the arrangement pattern determined based on the reflected light signal.

3. The vehicle of claim 1, wherein the controller is further configured to, when the receiver sensor is moving in a direction of travel:
    determine whether the other vehicle has a trajectory of motion that intersects with the direction of travel of the receiver sensor; and
    in response to a determination that the vehicle has an intersecting path of motion with the direction of travel, implement one or more control actions configured to adjust the direction of travel to not intersect with the trajectory of motion of the other vehicle.

4. The vehicle of claim 1, wherein determining that the plurality of reflectors is coupled to the other vehicle comprises comparing the arrangement pattern to a database of arrangement-patterns.

5. The vehicle of claim 4, wherein the controller is further configured to determine vehicle information using the database of arrangement patterns based at least in part on the detected arrangement pattern, wherein the vehicle information includes a vehicle make, a vehicle model, or both.

6. The vehicle of claim 1, wherein the controller is further configured to send vehicle information for the other vehicle to a display device, wherein the display device is configured to display a representation of the other vehicle based at least in part on the vehicle information.

7. The vehicle of claim 1, wherein the light signal comprises a code comprising identification information configured to identify a source of the light signal, and wherein the controller is configured to confirm the source of the light signal comprising identifying the code in the reflected light signal.

8. The vehicle of claim 1, wherein the controller is further configured to: determine whether the arrangement pattern is at least partially obscured, and wherein the controller is further configured to normalize the arrangement pattern based at least in part on aggregating the plurality of reflected light signals over the period of time.

9. The vehicle of claim 1, further comprising:
    a plurality of retroreflectors configured to have a peak reflectivity at a wavelength for non-visible light, wherein the plurality of retroreflectors are configured to reflect a signal comprising non-visible light;
    a front panel comprising a front subset of the plurality of retroreflectors comprising a front arrangement pattern;
    a rear panel comprising a rear subset of the plurality of retroreflectors comprising a rear arrangement pattern; and
    a side panel comprising a side subset of the plurality of retroreflectors comprising a side arrangement pattern.

10. The vehicle of claim 9, wherein the wavelength for non-visible light is approximately 890-980 nm.

11. The vehicle of claim 9, wherein the plurality of retroreflectors comprises one or more refractive retroreflectors, one or more spherical retroreflectors, one or more corner-cube retroreflectors, or any combination thereof, and wherein the plurality of retroreflectors are configured to reflect the signal as a reflected signal, and wherein the reflected signal is substantially parallel to the signal.

12. The vehicle of claim 9, further comprising a bandpass filter coupled to the front panel, the rear panel, the side panel, or any combination thereof, wherein the bandpass filter is configured to filter visible light from reflection by the plurality of retroreflectors.

13. The vehicle of claim 12, wherein the bandpass filter comprises a non-conductive material comprising acrylonitrile butadiene styrene (ABS) plastic, polythene plastic, polyethylene plastic, polystyrene plastic, polyvinyl chloride plastic, a thermoplastic polymer, acrylic plastic, glass, or any combination thereof.

14. The vehicle of claim 9, wherein the front arrangement pattern, the rear arrangement pattern and the side arrangement pattern each comprise different patterns, wherein the front arrangement pattern is configured to identify the front panel, wherein the rear arrangement pattern is configured to identify the rear panel, and wherein the side arrangement pattern is configured to identify the side panel.

15. A non-transitory computer-readable storage medium storing instructions that, when executed by one or more processors, cause the one or more processors to:
   receive, from a receiver sensor, sensor data corresponding to reflected light signals comprising a first reflected light signal emitted from a light source at a first point in time and a second reflected light signal emitted from the light source at a second point in time, the reflected light signals received over a period of time from a plurality of reflectors;
   determine an arrangement pattern of the plurality of reflectors based at least in part on the sensor data;
   identify a vehicle comprising the plurality of reflectors based at least on the arrangement pattern corresponding to a known pattern for vehicles;
   determine a first relative distance to the vehicle based at least in part on the first reflected light signal;
   determine a second relative distance to the vehicle based at least in part on the second reflected light signal; and
   determine whether the vehicle is stationary based at least in part on the first relative distance, the second relative distance and a velocity of the receiver sensor.

16. The non-transitory computer-readable storage medium of claim 15, wherein the instructions further cause the one or more processors to:
   determine whether the arrangement pattern is at least partially obstructed from view of the receiver sensor;
   receive additional sensor data comprising multiple reflected light signals; and
   aggregate multiple reflected light signals to normalize the sensor data to normalize the arrangement pattern.

17. The non-transitory computer-readable storage medium of claim 15, wherein the instructions further cause the one or more processors to:
   instruct the light source to emit one or more light signals to the vehicle, wherein the one or more light signals are reflected by the plurality of reflectors as the one or more reflected light signals.

18. The non-transitory computer-readable storage medium of claim 15, wherein the instructions further cause the one or more processors to:
   query a database using the arrangement pattern; and
   determine information for the vehicle using the database.

* * * * *